United States Patent [19]
Romanelli

[11] 4,054,789
[45] Oct. 18, 1977

[54] VEHICLE SAFETY LIGHT

[76] Inventor: Frances Romanelli, 162 W. Oldis St., Rochelle Park, N.J. 07662

[21] Appl. No.: 672,041

[22] Filed: Mar. 30, 1976

[51] Int. Cl.² .................................................. B60Q 1/26
[52] U.S. Cl. ........................................ 362/80; 340/87; 362/71
[58] Field of Search ................ 240/8.18, 8.3; 340/87

[56] References Cited

U.S. PATENT DOCUMENTS

| 2,891,235 | 6/1959 | Halpert | 240/8.18 X |
|---|---|---|---|
| 3,175,186 | 3/1965 | Barenyi | 240/8.18 X |
| 3,287,548 | 11/1966 | Kompier | 240/8.18 X |

*Primary Examiner*—Fred L. Braun
*Attorney, Agent, or Firm*—Allen D. Brufsky

[57] ABSTRACT

A vehicular warning light mounted in a storage position on a bracket in the interior of the trunk of a motor vehicle. The bracket is attached to the trunk cover. Upon lifting the trunk cover and closing a switch mounted on the dashboard of the vehicle, a flashing red light is activated and a latch retracted to enable the light to pivot to a use position in a substantially vertical plane.

6 Claims, 5 Drawing Figures

U.S. Patent  Oct. 18, 1977  4,054,789
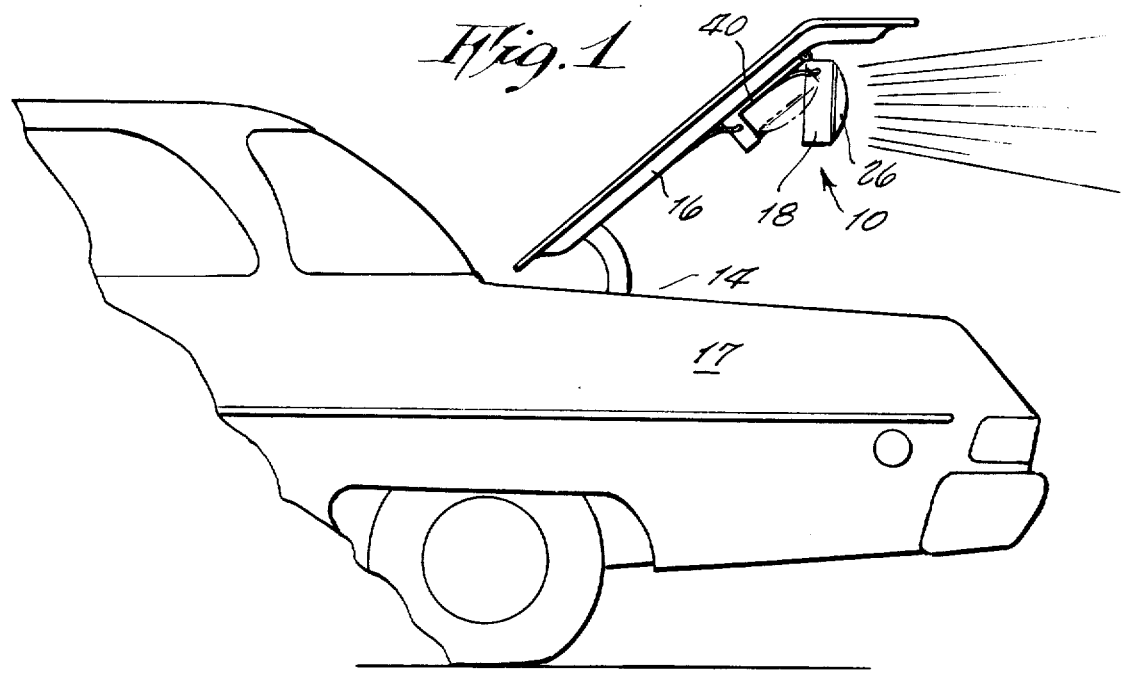
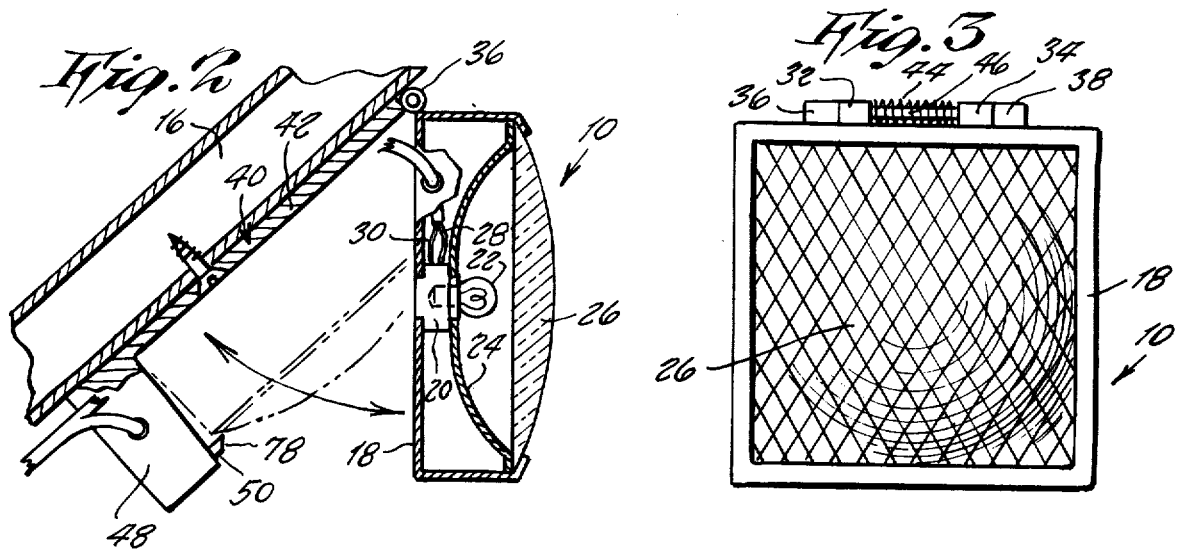
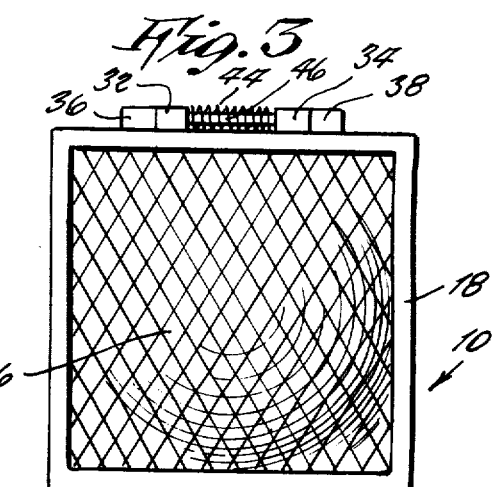
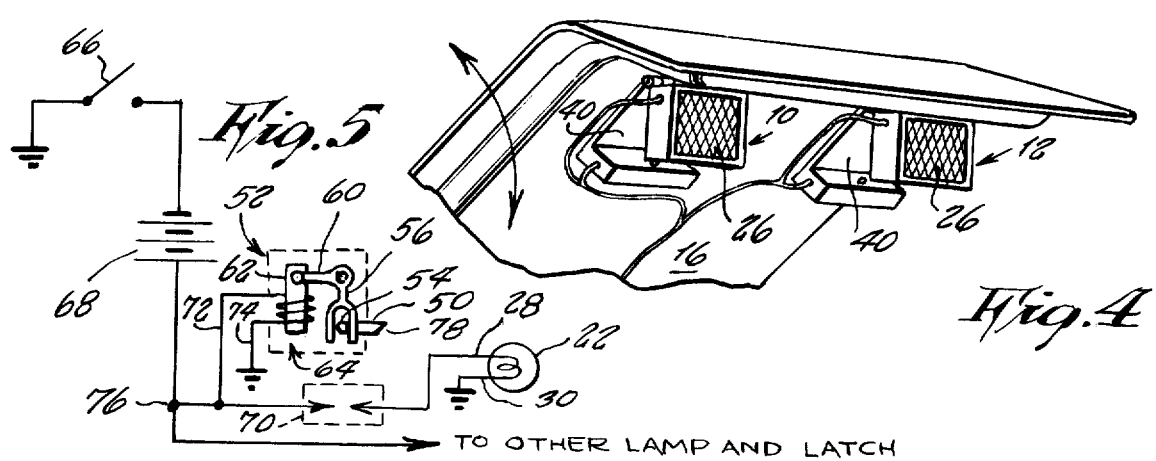

4,054,789

VEHICLE SAFETY LIGHT

BACKGROUND OF THE INVENTION

This invention relates to a vehicular warning light to warn approaching motorists of a stalled or stopped vehicle.

In the event an automobile breaks down on the road because of mechanical, tire, or other trouble, especially at night, the operator will requie some sort of warning device at the rear of the vehicle to warn motorists approaching from a considerable distance. The conventional warning device is a flare, which is steady burning, has limited life and requires the operator to light and position a number of such flares behind the vehicle. Often, such flares are not carried within the vehicle when an emergency arises.

SUMMARY OF THE INVENTION

Accordingly, this invention provides a vehicular warning light which is permanently mounted in the trunk of the vehicle and which is instantly put into operation by lifting the trunk compartment cover and pulling a switch mounted upon the dashboard. The swich activates a pair of flashing red lights mounted on brackets fixed to the trunk cover and causes the retraction of a latch element holding the lights on the bracket, enabling the lights to swing to a vertical position. These permanent flashing lights eliminate the time required for lighting conventional flares and provide a move readily discernable signal than a steady burning light.

BRIEF DESCRIPTION OF THE DRAWING

Further objects and advantages of the invention will become more apparent from the following description and claims, and from the accompanying drawing, wherein:

FIG. 1 is a side view in elevation of a motor vehicle equipped with a pair of safety lights of the present invention mounted on the interior of the trunk compartment cover;

FIG. 2 is a longitudinal cross-sectional through the light illustrated in FIG. 1;

FIG. 3 is a front view in elevation of the light of FIG. 2;

FIG. 4 is a perspective view of the motor vehicle trunk compartment cover and lights of FIG. 1; and FIG. 5 is an electrical schematic diagram of an electrical circuit for activating the lights of this invention.

DETAILED DESCRIPTION OF THE PREFERRED EMBODIMENT

Referring now to the drawing in detail, wherein like numerals indicate like elements throughout the several views, a pair of vehicular warning lights 10 and 12 are mounted in the interior of trunk compartment 14 on cover 16 of a motor vehicle 17.

Each light 10, 12 includes a substantially square housing 18 having a socket 20 and flashing bulb 22 mounted in socket 20 and extending through a concave reflector 24 behind a convex red lens 26. Wires 28, 30 for activating bulb 22 are connected to socket 20 and extend through a side wall of housing 18.

The top housing 18 has a pair of hinge members 32, 34 integrally connected thereto which are placed in side by side relation with hinge members 36, 38, respectively, of an L-shaped mounting bracket 40, whose longer leg 42 is threadedly connected to cover 16 of trunk compartment 14. A hinge pin 44 extends through and pivotally connects hinge members 32, 34 to hinge members 36, 38 on mounting bracket 40. A coil spring 46 is positioned about hinge pin 44 and has one end connected to hinge member 36 and its other end connected to hing member 34 to urge housing 18 to assume a vertical position as shown in FIG. 2.

The shorter leg 48 of mounting bracket 40 is hollow and houses a retractible latch member 50 and its associated mechanism 52 for holding housing 18 in the phantom line position shown in FIG. 2, complementally seated on mounting bracket 40, when not in use. Latch member 50, when extended, contacts the front of housing 18 to preclude housing 18 from assuming the vertical use position of FIG. 2. The end of latch member 50 has a pin positioned between the arms of a yoke member 56, which in turn is pivotally connected to a lever 60 pivotally connected to the armature 62 of a solenoid 64.

When an emergency arises requiring use of warning lights 10 and 12, the operator of motor vehicle 17 opens trunk cover 16 and closes a switch 66 mounted on the dashboard of vehicle 17. This establishes a series electric circuit from battery 68 through a conventional flasher unit 70 to bulb 22 in one of lights 10, 12 as shown in FIG. 5. Simultaneously, a seris circuit is established from battery 68 to solenoid 62 through wires 72, 74 which enter the side wall of hollow leg 48 of mounting bracket 40, to extend armature 62 upwardly (as shown in FIG. 5) to retract latch member 50, allowing the light to pivot under the urging of coil spring 46 to a vertical use position as shown in FIGS. 1, 2 and 4. Flasher unit 70 activates bulb 22 to flash intermittently, which light is reflected by slector 24 through red lens 26 as a warning signal. The other one of lights 10, 12 operates in an identical manner by connecting an identical circuit as that shown in figures to terminal 76 of the circuit of FIG. 5.

When use of lights 10, 12 is no longer necessary, switch 66 is reopened, causing latch members 50 associated with each light 10, 12 to be extended. Latch member 50 has a cam surface 78 which upon contact by the bottom surface of housing 18 will cause latch element 50 to retract momentarily so that housing 18 is positioned in the phantom line position in FIG. 2 and then latch element 50 is repositioned in front of housing 18 to lock it in stored position.

I claim:

1. A warning light adapted to be secured to the interior surface of the trunk cover of a motor vehicle comprising:

a housing including electrical socket means for receiving a bulb, a reflector, and a lens for transmitting reflected light from a bulb electrically connected to said electrical socket means, bracket means for mounting said housing on a trunk cover of a motor vehicle including a bracket, hinge means pivotally connecting said housing to said bracket for pivotal movement from a storage position wherein said housing is complementally supported by said bracket to a use position in a substantially vertical plane, means associated with said hinge means for urging said housing to its use position, retractible latch means for locking said housing in is storage position, and electrical circuit means connected to said socket means and retractible latch means for simultaneously activating a bulb received within said socket means and retracting said latch means.

2. A warning light in accordance with claim 1 wherein said urging means is a coil spring connected to said hinge means.

3. A warning light in accordance with claim 1 wherein said circuit means including switch means which when closed will simultaneously activate said bulb and retract said latch means.

4. A warning light in accordance with claim 3 wherein said latch means is solenoid activated.

5. A warning light in accordance with claim 1 wherein said bracket means includes
a substantially L-shaped bracket adapted to be connected to the trunk cover of a motor vehicle.

6. A warning light in accordance with claim 5 wherein one of the legs of said L-shaped bracket is hollow, and contains said retractible latch means.

* * * * *